United States Patent Office 2,831,850
Patented Apr. 22, 1958

2,831,850

WATER-INSOLUBLE MONOAZO DYESTUFFS

Ernest Merian, Bruno J. R. Nicolaus, and Walter Wehrli, Basel, Switzerland, assignors, by mesne assignments, to Saul & Co., Newark, N. J., as nominee of Fidelity Union Trust Company, executive trustee under Sandoz Trust No Drawing. Application February 24, 1956
Serial No. 567,469

Claims priority, application Switzerland
February 25, 1955

7 Claims. (Cl. 260—207)

The present invention relates to water-insoluble monoazo dyestuffs which are useful as dyestuffs for cellulose ester fibers, polyvinyl fibers, synthetic polyamide fibers and terephthalic acid ester fibers.

More particularly the invention has especial relation to a group of water-insoluble monoazo dyestuffs which correspond to the general formula

(I)

wherein R stands for the radical of a mono- or dinuclear aromatic hydroxy compounds coupled in the ortho- or para-position to the hydroxy group, and $R_1$ for an alkyl, cycloalkyl, aralkyl or aryl radical which may be further substituted, and the nucleus A may carry any desired substituents commonly present in azo dyestuffs with the exception of solubilizing groups.

The process for their production consists in uniting 1 mol of the diazo compound of a 1-aminophenyl-4-carbamic acid ester which may be further substituted with 1 mol of a mono- or dinuclear aromatic hydroxy compound coupling in the ortho- or para-position to the hydroxy group.

Another operating procedure of the process consists in reacting 1 mol of an aminomonoazo compound of the general formula

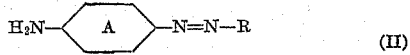
(II)

wherein R and A have the meanings assigned to them above, with 1 mol of a chloroformic acid ester.

Examples of suitable mono- or dinuclear aromatic hydroxy compounds coupling in the ortho- or para-position to the hydroxy group of hydroxybenzenes, hydroxynaphthalenes, hydroxydiphenyls, hydroxyquinolines, hydroxyisoquinolines, hydroxyquinoxalines, hydroxyquinazolines and hydroxycinnolines which may be substituted by halogen, alkyl, alkoxy, amino, alkylamino, dialkylamino, acylamino or sulfonylamino.

The alkyl, cycloalkyl, aralkyl or aryl group, denoted by $R_1$ in Formula I may more specifically represent a branched or an unbranched aliphatic alkyl group with 1 to 6 carbon atoms and which may contain hydroxy groups, ether groups and/or secondary amino groups, an aliphatic alkyl group substituted by aryl, aryloxy or a hetero ring and having in all not more than 11 carbon atoms, or a phenyl group which may be substituted by halogen atoms and/or methyl, methoxy, ethoxy, dimethylamino or diethylamino groups.

The radical A may within the present definition contain further substituents commonly present in azo dyestuffs, for example halogen atoms, hydroxy, methyl, methoxy, ethoxy, nitro, alkylsulfonyl and/or alkylaminosulfonyl groups.

The coupling of the diazo compound with the azo component according to the first operating procedure of the process may be conducted in an acid, alkaline or neutral medium.

The 1-aminophenyl-4-carbamic acid esters used as starting materials may be obtained, for example, by reduction of nitro compounds of the general formula

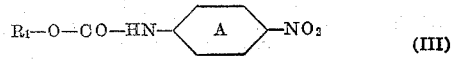
(III)

wherein $R_1$ and A have the meanings heretofore recited, or by partial hydrolysis of acylamino compounds of the general formula

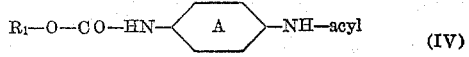
(IV)

wherein $R_1$ and A also possess the significances assigned to them above.

The reaction of the aminomonoazo compounds (II) with the chloroformic acid esters according to the second operating procedure of the process is carried out to advantage in solution (for example in an indifferent organic solvent) or in very fine aqueous suspension, preferably in presence of a proton acceptor. Wide variations of temperature are permissible, according to the operating procedure employed.

If on formation the monoazo dyestuff contains a free amino group this can be subsequently closed by acylation with an aliphatic carboxylic acid which may be further substituted or with a functional derivative of the same or with a further mol of a chloroformic acid ester. Isolation of the dyestuff is effected by one of the customary basis operations such as, for example, filtration, reduction of the volume of solvent, precipitation from the solvent by means of a suitable agent.

The new monoazo dyestuffs dye cellulose ester fibers (e. g. acetate silk, cellulose triacetate), synthetic polyamide fibers (e. g. nylon, Perlon), polyvinyl fibers and terephthalic acid ester fibers (e. g. Terylene, Dacron) in yellow to orange shades characterized by excellent fastness to washing. When the monoazo dyestuffs contain groups capable of being metallized, the fastness to washing of the dyeings can be further improved by aftertreatment with metal-yielding agents. The new products are dyed on the above mentioned fibers from suspension, preferably in presence of compounds having dispersing action and at elevated temperature. In certain cases the rate of dyeing of the dyestuffs can be further improved by mixing two or more dyestuffs of the general Formula I.

Some of the new dyestuffs are also suitable for coloring lacquers, oils and synthetic resins, and for dyeing synthetic fibers, especially cellulose ester fibers in the mass, the shades thus obtained having excellent fastness to light, washing and sublimation. A certain number of them also dye wool and silk.

The water-insoluble monoazo dyestuffs particularly suitable for dyeing cellulose ester fibers from aqueous suspensions or in the dope correspond to the general formula

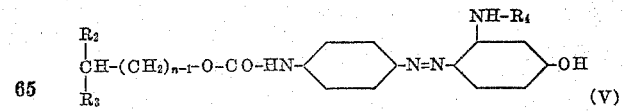
(V)

wherein $R_2$ stands for hydrogen or a lower branched or unbranched alkyl radical, $R_3$ stands for H, OH, alkoxy, dialkylamino or a lower alkyl radical, $R_4$ stands for an acyl radical containing from 1 to 18 carbon atoms, and $n$ stands for one of the integers 1, 2, 3, 4, 5 and 6.

The following examples show how the present process may be carried out. They are by no means limitative, however, in respect to the choice of starting materials and the operating condition. All parts and percentages specified in the examples are by weight; temperatures are given in degrees centigrade and the melting points are uncorrected.

*Example 1*

27.4 parts of the chlorhydrate of 1-aminophenyl-4-carbamic acid-(3'-methoxy)-butyl ester are finely powdered and drop-fed in presence of 150 parts of water and 23 parts of hydrochloric acid 30% with a solution of 7 parts of sodium nitrite and 50 parts of water at 0.° The resulting diazo solution is united in the normal manner, in presence of 11 parts of calcium hydroxide, with a solution of 15.5 parts of 1-hydroxy-3-acetylaminobenzene in 300 parts of pyridine at 3–5°. After a short time the mass is acidified. The precipitated dyestuff is then filtered off and dried. A good yield of the 1-(2'-acetylamino-4'-hydroxy)-phenylazo-phenyl-4-carbamic acid-(3''-methoxy-butyl ester thus formed is obtained. The new product crystallizes from alcohol or acetic ester in the form of attractive yellow-orange needles having a melting point of 208–209°. It dissolves in acetic ester with a greenish yellow coloration and in concentrated sulfuric acid with an orange coloration. The product dyes acetate silk, cellulose triacetate and synthetic polyamide fibers in yellow shades of excellent fastness to washing and sea water. The dyeings are also dischargeable, besides being fast to light and sublimation. It is possible to arrive at dye-stuffs with similar properties when the 1-hydroxy-3-acetylaminobenzene of the example is replaced by 1-hydroxy-3-trifluoracetylaminobenzene, 1 - hydroxy - 3 - monochloroacetylaminobenzene, 1 - hydroxy - 3 - trichloracetylaminobenzene, 1 - hydroxy - 3 - hydroxyacetylaminobenzene, 1-hydroxy - 3 - butyrylaminobenzene, 1 - hydroxy - 3 - isobutyrylaminobenzene, 1 - hydroxy - 3 - crotonylaminobenzene, 1 - hydroxy - 3 - methoxyacetylaminobenzene, 1-hydroxy - 3 - (3' - methoxy) - propionylaminobenzene, 1-hydroxy - 3 - (4' - methoxy) - butyrylaminobenzene, 1-hydroxy - 3 - (3' - hydroxy) - propionylaminobenzene, 1-hydroxy - 3 - (4' - hydroxy) - butyrylaminobenzene, 1-hydroxy - 3 - hexanoylaminobenzene,1 - hydroxy - 3 - dodecanoylaminobenzene, 1 - hydroxy - 3 - tetradecanoylaminobenzene, 1 - hydroxy - 3 - hexadecanoylaminobenzene, 1 - hydroxy - 3 - octadecanoylaminobenzene, 1 - hydroxy - 3 - phenylacetylaminobenzene, 1 - hydroxy - 3- benzoylaminobenzene, 1 - hydroxy - 3 - hexahydrobenzoylaminobenzene, 1 - hydroxy - 3 - methylsulfonylaminobenzene, 1 - hydroxy - 3 - monoethylaminobenzene, 1 - hydroxy - 3 - diethylaminobenzene, 1 - hydroxy - 4 - acetylaminonaphthalene or 1 - hydroxy - 3 - [N - 4' - methyl)-phenylsulfonyl-N-methyl]-aminobenzene.

The 1-aminophenyl-4-carbamic acid-(3'-methoxy)-butyl ester used in this example is new and can be synthesized in the following manner:

100 parts of water, 16 parts of crystallized sodium acetate and 15 parts of 1-acetylamino-4-aminobenzene are well mixed and cooled to 0°. To the reaction mixture are added dropwise with vigorous stirring 18 parts of chloroformic acid-(3-methoxy)-butyl ester. When the reaction is completed, the precipitate is filtered off, washed and dried. A good yield of the 1-acetylaminophenyl-4-carbamic acid-(3'-methoxy)-butyl ester is obtained in this way; it can be purified by recrystallization from dilute alcohol, upon which it melts at 128°. Of the product thus obtained, 28 parts are boiled with 150 parts of hydrochloric acid 10% at the reflux to give a clear, violet-tinged solution. As soon as the reaction is completed, the mixture is cooled and the resulting chlorhydrate of the 1-aminophenyl-4-carbamic acid-(3'-methoxy)-butyl ester isolated by precipitation with a suitable agent, for example acetone, or by evaporating under reduced prssure. A very good yield is obtained.

The dyestuff obtained according to paragraph 1 of this example corresponds to the formula

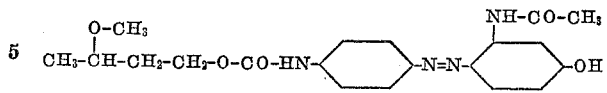

*Example 2*

26.4 parts of the chlorhydrate of 1-aminophenyl-4-carbamic acid phenyl ester are finely powdered and diazotized at 0° as described in Example 1. The resulting diazo solution is united in the normal manner with a solution of 11 parts of 1-hydroxy-4-methylbenzene, 15 parts of caustic soda 30% and 25 parts of soda in 200 parts of water at 3–5°. After a short time the monoazo dyestuff thus formed is filtered off, washed free of alkali with water and dried. A good yield of 1-(2'-hydroxy-5'-methyl)-phenylazo-phenyl-4-carbamic acid phenyl ester is obtained. The new product can be recrystallized from alcohol in the form of lustrous orange flakes with melting point 186–187°. It dissolves in acetic ester with a greenish yellow coloration and in concentrated sulfuric acid with an orange coloration, and dyes synthetic polyamide fibers in yellow shades of excellent fastness to washing and sea water. It also possesses excellent affinity for Orlon 42, on which it yields dyeings notable for their outstanding fastness to washing, sea water, hot pressing and sublimation.

The 1-aminophenyl-4-carbamic acid phenyl ester used in this example is new and can be synthesized in the following way:

100 parts of water, 16 parts of crystallized sodium acetate and 15 parts of 1-acetylamino-4-aminobenzene are well mixed and cooled to 0°. 19 parts of chloroformic acid phenyl ester are dropped into the reaction mixture with thorough stirring. When the reaction is completed, the precipitate is filtered off, washed and dried. A good yield of the 1-acetylaminophenyl-4-carbamic acid phenyl ester is obtained thus; it can be purified by redissolving from alcohol, upon which it melts at 190°.

27 parts of this product are boiled at the reflux with 150 parts of hydrochloric acid 10% and 150 parts of ethyl alcohol until hydrolysis is completed. The reaction mixture is then cooled and the resulting chlorhydrate of the 1-aminophenyl-4-carbamic acid phenyl ester isolated by precipitation with a suitable agent, for example acetone, or by boiling down under reduced pressure. The yield is very good.

Similar dyestuffs are obtained if the chlorhydrate of the 1-aminophenyl-4-carbamic acid phenyl ester of the example is replaced by the chlorhydrate of the 1-aminophenyl-4-carbamic acid alkylphenyl, alkoxyphenyl, benzyl, phenylethyl or morpholinoethyl ester.

The dystuff obtained according to paragraph 1 of this example corresponds to the formula

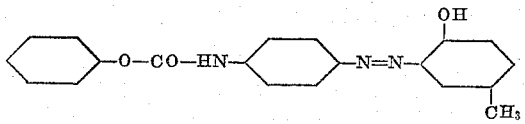

*Example 3*

27.4 parts of the chlorhydrate of 1-aminophenyl-4-carbamic acid-(3'-methoxy)-butyl ester are diazotized as described in Example 1. The resulting diazo solution is united in the normal way with a solution of 15 parts of 8-hydroxyquinoline, 30 parts of acetic acid 100% and 17 parts of sodium acetate in 300 parts of water at 5–10°. After some time the monoazo dyestuff thus formed is filtered off and dried; a good yield of the 1-(8'-hydroxyquinolyl-5')-azo-phenyl-4-carbamic acid-(3''-methoxy)-butyl ester is obtained. The new product can be further purified by recrystallization from alcohol (melting point 152–153°). It dissolves in acetic ester with a golden-yellow coloration and in concentrated sulfuric acid with a red coloration, and dyes acetate silk and synthetic polyamide fibers in orange shades. The fastness properties of the dyeings, in particular fastness to washing, may be substantially improved by after treatment with copper-yielding agents.

Dyestuffs with similar properties are obtained when the 8-hydroxyquinoline of the example is replaced by 5-hydroxyquinoline or 8-hydroxyquinazoline, or when the diazo compound of the example is coupled with 1-hydroxy-2-acetylaminobenzene and the acetyl group subsequently split off by hydrolysis.

The dyestuff obtained according to paragraph 1 of this example corresponds to the formula

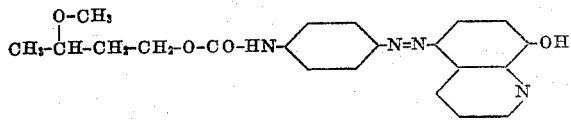

*Example 4*

27.4 parts of the chlorhydrate of 1-aminophenyl-4-carbamic acid-(3'-methoxy)-butyl ester are diazotized as described in Example 1. The resulting diazo solution is united in the normal manner with 11 parts of 1-hydroxy-3-aminobenzene in dilute hydrochloric acid. After the coupling reaction has been completed by the addition of sodium acetate, the monoazo dyestuff so formed is filtered off, washed and dried.

35.8 parts of the product thus obtained are digested at 100° with 100 parts of acetic anhydride; the mass is boiled down "in vacuo" and the new product recrystallized if desired from acetic acid (melting point 187°). It dissolves in acetic ester to give yellow-colored solutions and in concentrated sulfuric acid to give golden-yellow solutions, and dyes acetate silk and synthetic polyamide fibers in yellow shades having good fastness properties.

The dyestuff so obtained corresponds to the formula

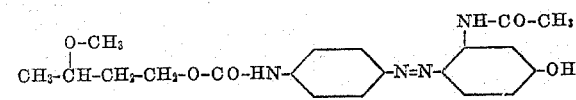

*Example 5*

27.4 parts of the chlorhydrate of 1-aminophenyl-4-carbamic acid-(3'-methoxy)-butyl ester are finely powdered and diazotized as described in Example 1. The diazo solution thus obtained is united in the normal way with a solution of 26 parts of 1-hydroxy-3-decanoylaminobenzene in 300 parts of pyridine in presence of 11 parts of calcium hydroxide at 3–5°. After some time the mass is acidified, upon which the precipitated dyestuff is filtered off and dried. A good yield of the 1-(2'-decanoylamino-4'-hydroxy)-phenylazo-phenyl-4-carbamic acid-(3''-methoxy)-butyl ester is obtained. The new product can be re-dissolved from alcohol, upon which it melts at 155°. It dissolves in acetic ester with a greenish yellow coloration and dyes acetate silk in the dope in yellow shades of excellent fastness to washing and cross-dyeing. The dyeings are also fast to gas-fumes and peroxides bleaching and extremely fast to light.

The dyestuff obtained according to this example corresponds to the formula

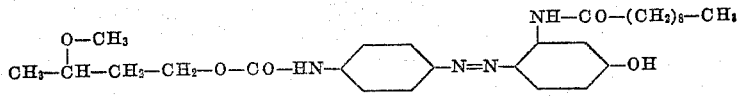

Similar properties as the dyestuffs of Example 5 are possessed by the dyestuffs obtained in an analogous manner and having the formulae:

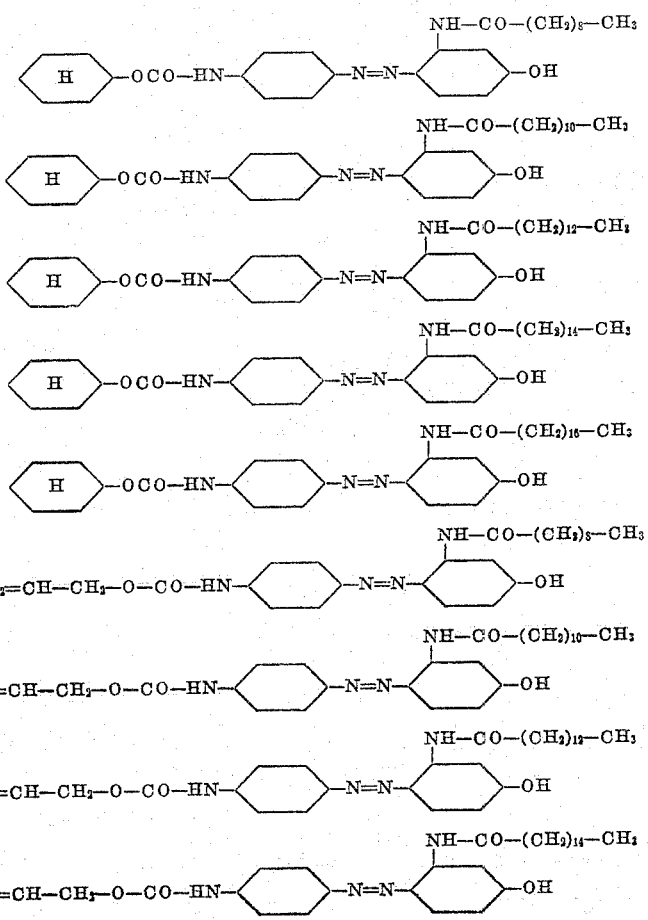

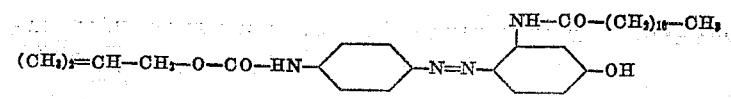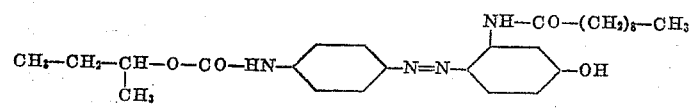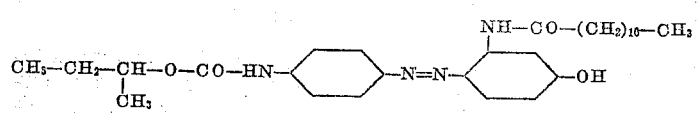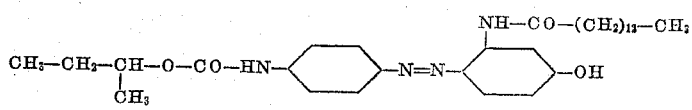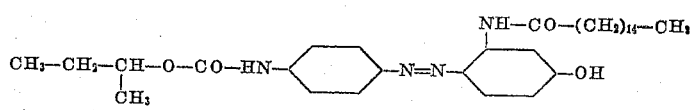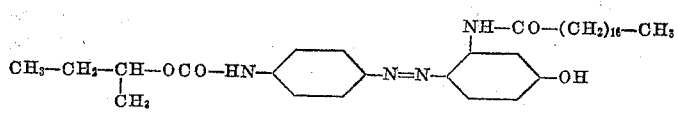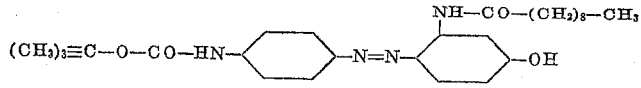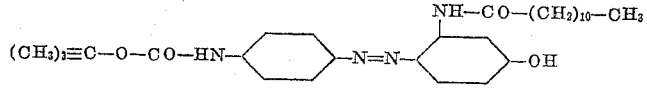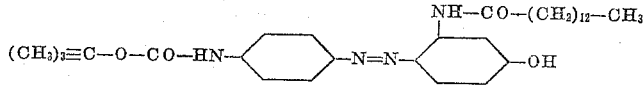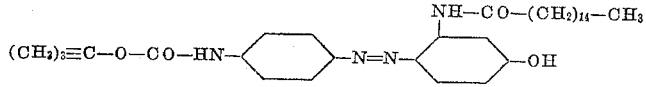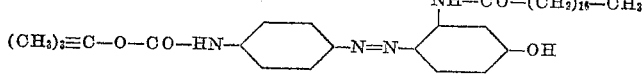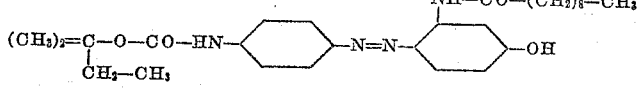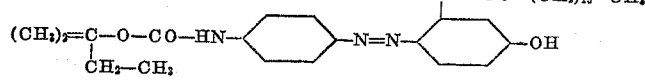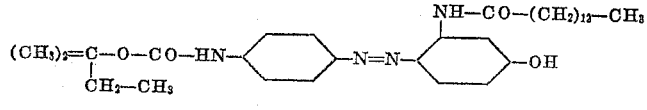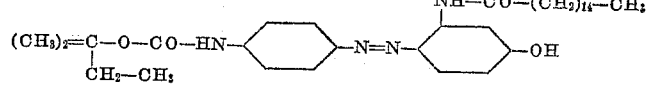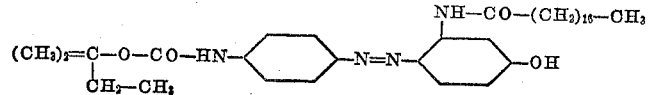

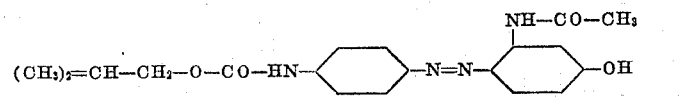
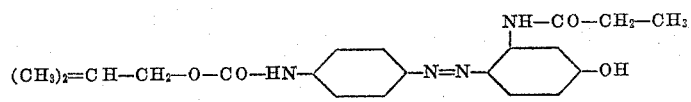
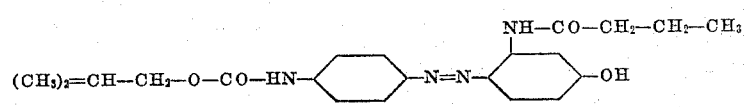
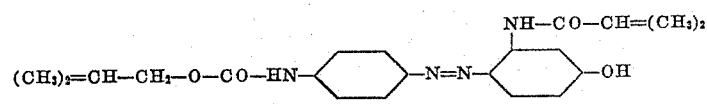
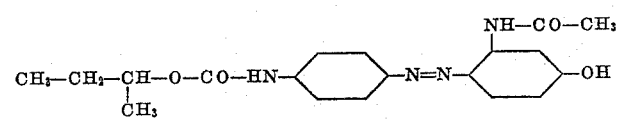
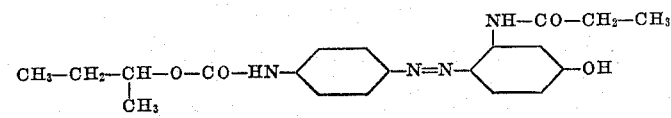
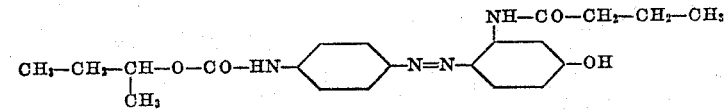
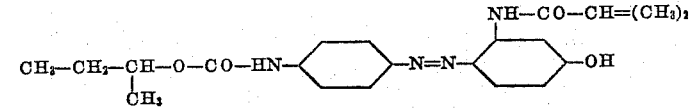
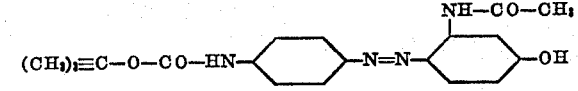
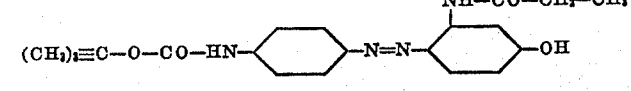
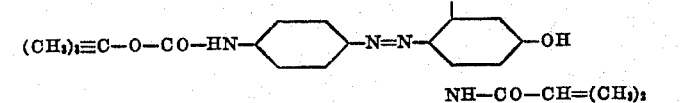
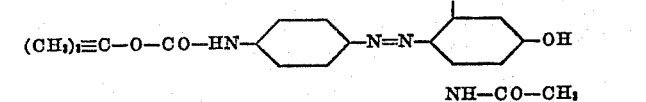
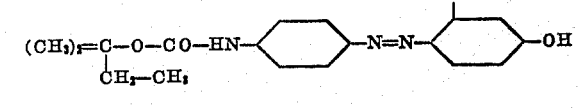
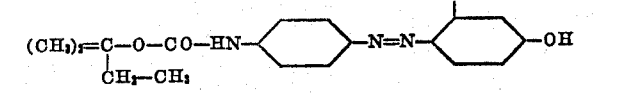
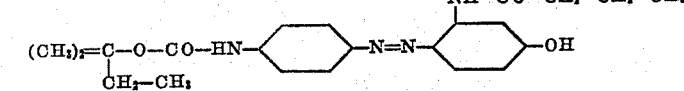
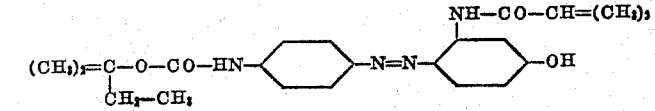

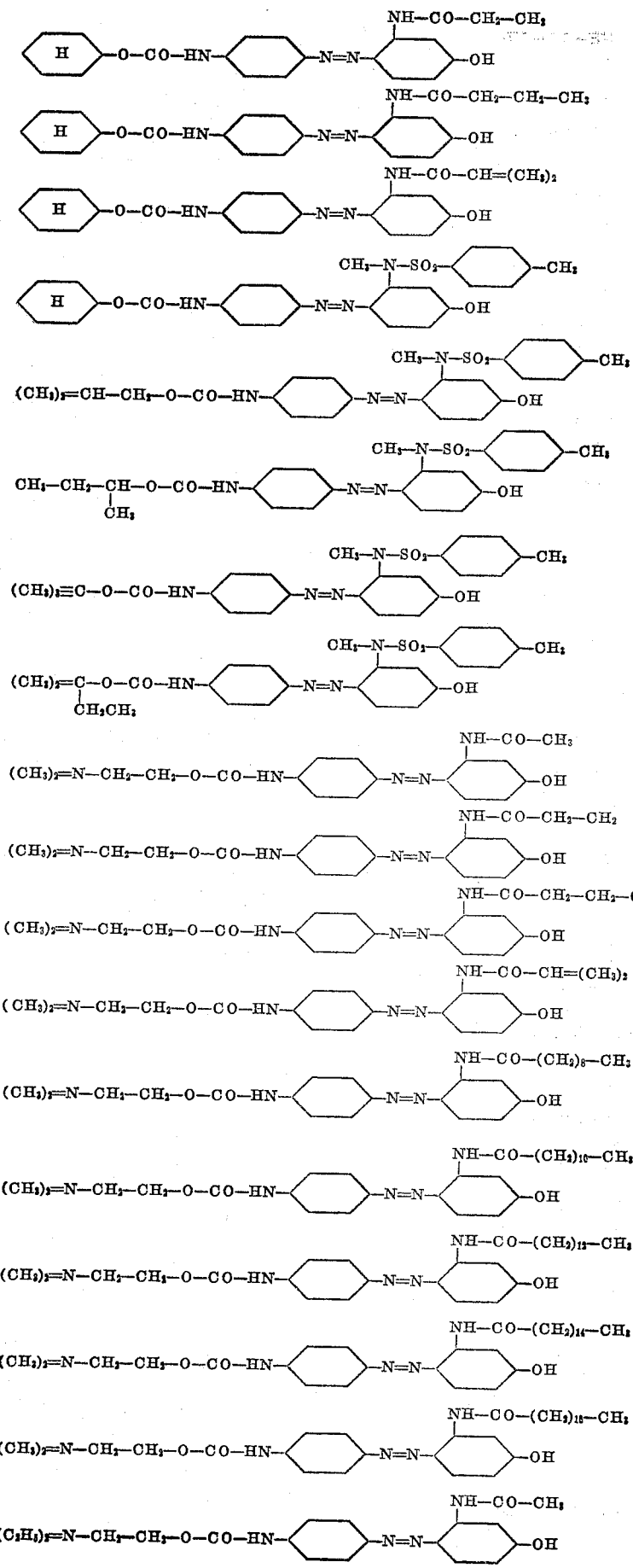

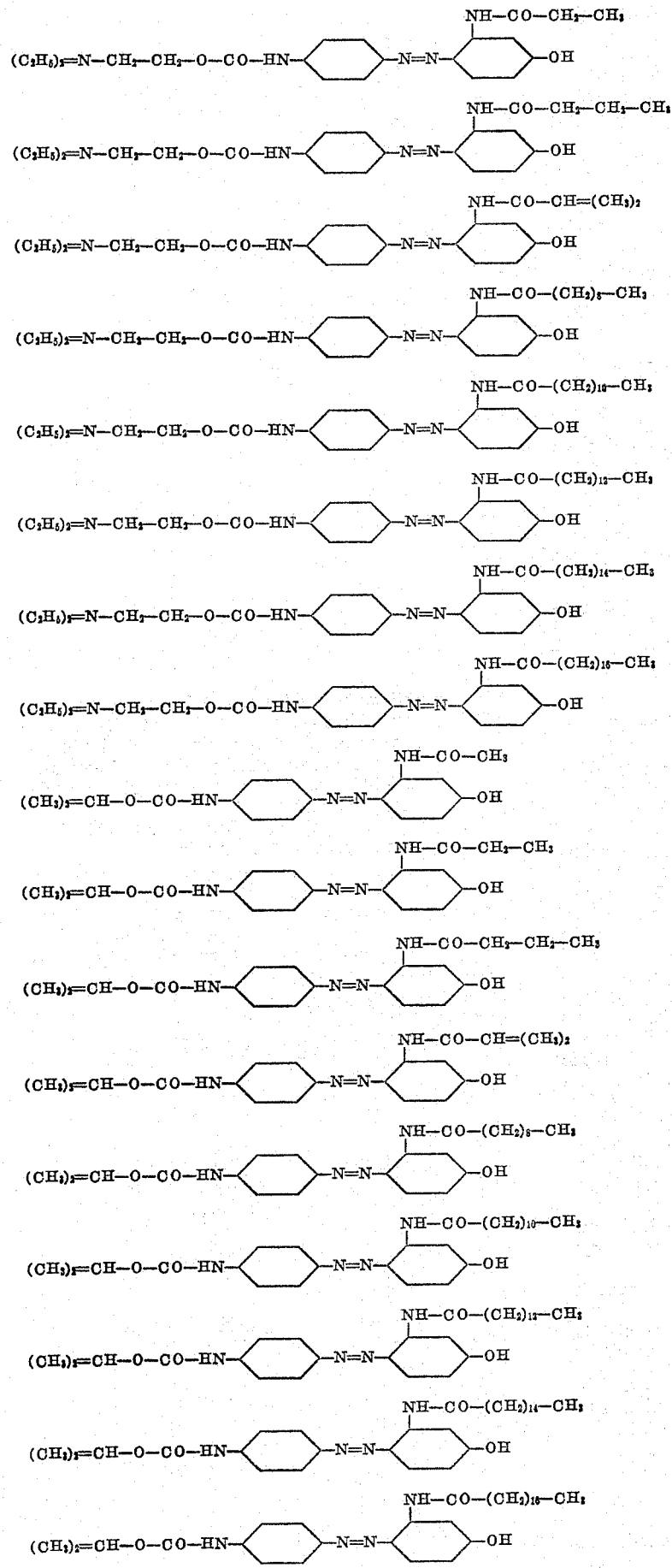

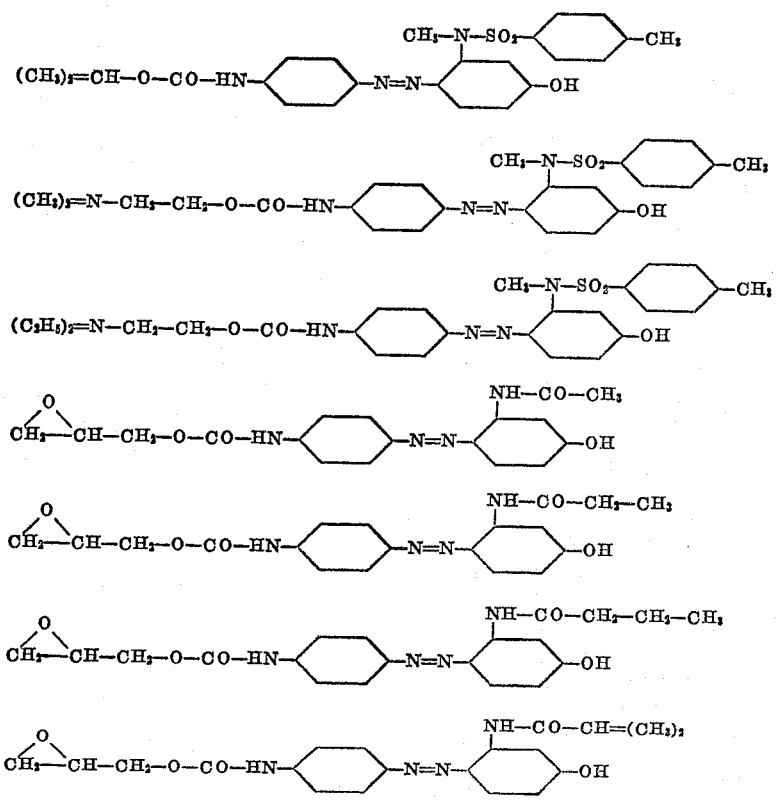

Example 6

25.8 parts of 1-amino-2-methylsulfonylphenyl-4-carbamic acid ethyl ester (melting point 143–144°) are finely powdered and dissolved warm in 152 parts of hydrochloric acid 8%. The red solution thus formed is cooled to 0° with thorough stirring and drop-fed with a solution of 7 parts of sodium nitrite and 50 parts of water. The resulting diazo solution is filtered if necessary and united in the normal manner with a solution of 11.4 parts of 1-hydroxy-2-methylbenzene in 250 parts of water, 4 parts of sodium hydroxide and 15 parts of sodium carbonate at 3–5°. On completion of coupling the precipitated dyestuff is separated out, washed free of alkali with water and dried. A good yield of 1-(4'-hydroxy - 3' - methyl) - phenylazo - 2 - methylsulfonylphenyl-4-carbamic acid ethyl ester is obtained. The new product can be redissolved from dilute alcohol or acetic ester, upon which it melts as 203°. It dissolves in acetic ester with a greenish yellow coloration and in concentrated sulfuric acid with an orange coloration, and dyes acetate silk, cellulose triacetate and synthetic polyamide fibers in yellow shades of excellent fastness to washing and sea water. In addition the dyeings are dischargeable, fast to light and sublimation, and extremely fast to hot pressing.

The 1-amino-2-methylsulfonylphenyl-4-carbamic acid ethyl ester used in this example is new and can be synthesized in the following way:

18.6 parts of 1.4-diamino-2-methylsulfonylbenzene are dissolved in 60 parts of anhydrous pyridine. 11 parts of chloroformic acid ethyl ester are added dropwise to the solution with good external cooling and vigorous stirring, so that the temperature of the reaction mixture does not exceed +10°. Following this, stirring is continued for 2 hours at room temperature and subsequently for 8 hours at 60–70°. After this time the reaction is completed; the reaction mass is allowed to cool to room temperature and is then transferred with thorough stirring into a mixture of 60 parts of water and 60 parts of ice. The precipitated product is separated out from pyridine by acidification with hydrochloric acid and filtering off. It is then well washed with water and recrystallized several times from dilute alcohol. It melts at 143–144°.

The above-mentioned 1.4-diamino-2-methylsulfonylbenzene can be obtained in good yield from 1-amino-2-methylsulfonyl-4-nitrobenzene by any one of the established reduction methods.

The dyestuff obtained according to paragraph 1 of this example corresponds to the formula

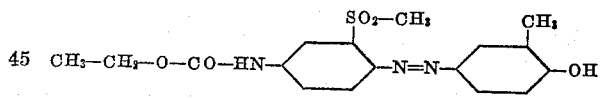

Similar properties as the dyestuffs of Example 6 are possessed by the dyestuffs obtained in an analogous manner and having the formulae:

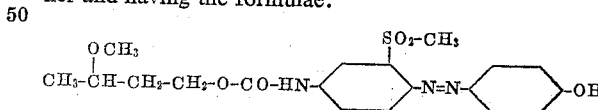

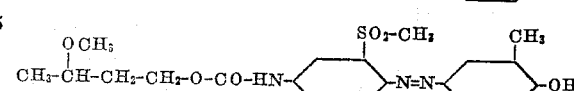

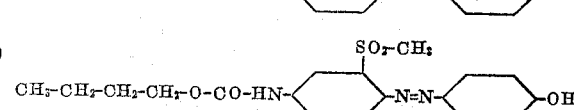

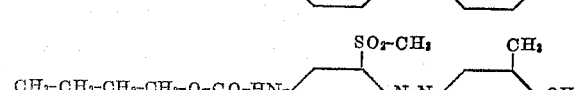

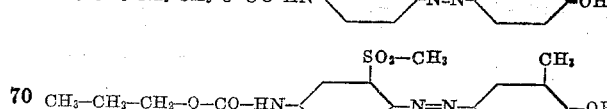

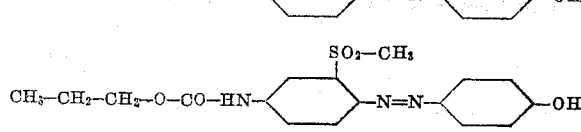

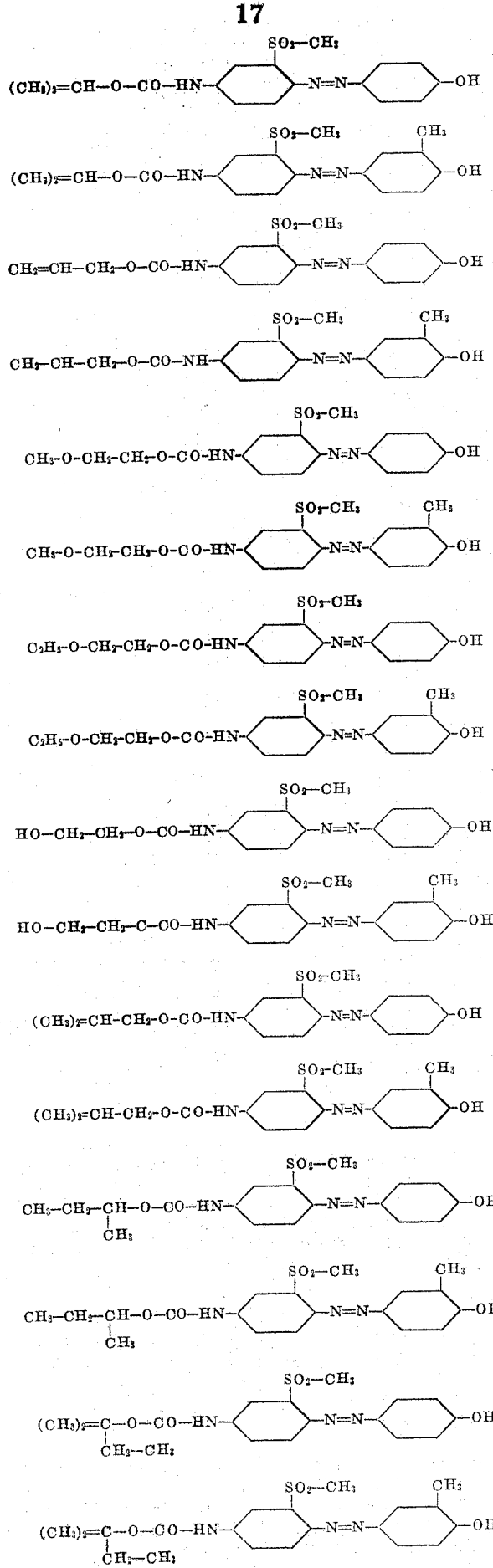

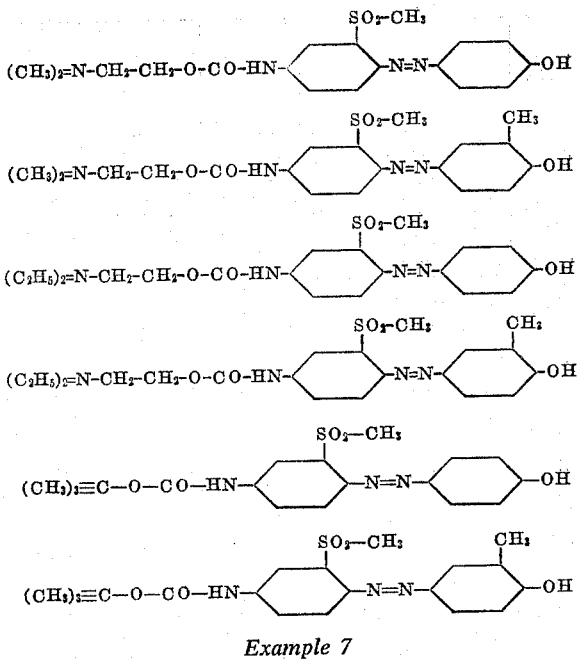

Example 7

22.7 parts of 2'-hydroxy-5'-methyl-4-amino-1.1'-azobenzene are dissolved in 150 parts of anhydrous pyridine. 11.5 parts of chloroformic acid ethyl ester are added dropwise with good external cooling and vigorous stirring, so that the temperature of the mixture does not exceed $+20°$. After this addition the mixture is stirred for about 2 hours at room temperature and subsequently for 8 hours at $70°$. As soon as the starting product can no longer be detected, the reaction mixture is allowed to cool to $20°$ and then diluted with a mixture of 250 parts of water and 200 parts of ice. The precipitated dyestuff is converted into a form suitable for filtering by acidification with hydrochloric acid. It is separated out, washed with ample water and rinsed. A good yield of the 1-(2'-hydroxy-5'-methyl)-phenylazo-phenyl-4-carbamic acid ethyl ester is obtained. The new product can be recrystallized from alcohol or acetic ester, upon which it melts at $155°$. It dissolves in acetic ester with a greenish yellow coloration and in concentrated sulfuric acid with a red-orange coloration, and dyes acetate silk and synthetic polyamide fibers in yellow shades of good fastness to washing. The dyeings are also dischargeable and fast to sublimations.

The dyestuff obtained according to this example corresponds to the formula

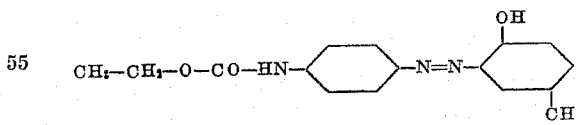

In the following table further valuable disperse dyestuffs are described which can be produced by one of the operating procedures of the process. They correspond to the general formula

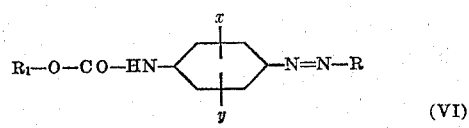

(VI)

The meanings of R, $R_1$, $x$ and $y$ are given in the columns under the respective headings. A further column contains the melting point of the new disperse dyestuffs, and in the last column the shades of the dyeings on acetate silk, synthetic polyamide fibers and polyester fibers are noted.

| Ex. No. | R₁ | x | y | R | M. P., degrees | Shade of the dyeings on acetate silk and synthetic polyamide fibers |
|---|---|---|---|---|---|---|
| 8 | 3-methoxybutyl | H | H | 2'-hydroxy-5'-acetylaminophenyl | 174 | Greenish yellow. |
| 9 | do | H | H | 2'-hydroxy-4'-acetylamino-5'-methylphenyl | 208 | Do. |
| 10 | do | H | H | 4'-hydroxyphenyl | 116 | Do. |
| 11 | do | H | H | 2'-hydroxynaphthyl | 182 | Orange. |
| 12 | do | H | H | 4'-hydroxy-5'-acetylaminophenyl | 190 | Greenish yellow. |
| 13 | do | H | H | 2'-hydroxy-5'-methylphenyl | 128 | Do. |
| 14 | Phenyl | H | H | 2'-hydroxy-5'-tert.-butylphenyl | 166 | Do. |
| 15 | do | H | H | 4'-hydroxy-5'-methylphenyl | 187 | Do. |
| 16 | 2-phenoxyethyl | H | H | 2'-hydroxy-5'-tert.-butylphenyl | 194 | Do. |
| 17 | do | H | H | 2'-hydroxy-5'-methylphenyl | 171 | Do. |
| 18 | do | H | H | 4'-hydroxy-5'-methylphenyl | 162 | Do. |
| 19 | 2-(2'-methoxy)-ethoxyethyl | H | H | 4'-hydroxyphenyl | 108 | Do. |
| 20 | do | H | H | 2'-hydroxynaphthyl | 140 | Orange. |
| 21 | do | H | H | 4'-hydroxy-5'-acetylaminophenyl | 167 | Greenish yellow. |
| 22 | do | H | H | 8'-hydroxyquinolyl (5') | 129 | Yellow-orange. |
| 23 | Ethyl | H | H | 2',4'-dihydroxyphenyl | ¹130 | Greenish yellow. |
| 24 | do | H | H | 2'-hydroxy-5'-methylphenyl | 154 | Do. |
| 25 | do | H | H | 4'-hydroxy-5'-carbomethoxyphenyl | 163 | Do. |
| 26 | 2-ethoxyethyl | H | H | 2'-hydroxy-5'-methylphenyl | 122 | Do. |
| 27 | Methyl | H | H | do | 166 | Do. |
| 28 | n-Butyl | H | H | do | 127 | Do. |
| 29 | 2-ethoxyethyl | H | H | 2'-hydroxynaphthyl | 188 | Orange. |
| 30 | Ethyl | H | H | 4'-hydroxy-5'-methylphenyl | 97 | Greenish yellow. |
| 31 | 2-ethoxyethyl | H | H | 2'-hydroxy-5'-chlorophenyl | 121 | Do. |
| 32 | Ethyl | H | H | 2'-hydroxy-3'-carbethoxyamino-5'-methylphenyl | 174 | Do. |
| 33 | 2-ethoxyethyl | H | H | 2'-hydroxy-8'-carbo-(2''-ethoxy)-ethoxyaminonaphthyl | 176 | Red. |
| 34 | Cyclohexyl | H | H | 2'-hydroxy-5'-methylphenyl | 155 | Yellow. |
| 35 | do | H | H | 2'-acetylamino-4'-hydroxyphenyl | 226 | Do. |
| 36 | Ethyl | 2-chloro | H | do | 255 | Do. |
| 37 | do | 2-methoxy | 5-methyl | do | >320 | Do. |
| 38 | do | 2-methylsulfonyl | H | do | 265 | Do. |
| 39 | do | 2-nitro | H | do | 248 | Do. |
| 40 | 2-hydroxyethyl | H | H | do | 228 | Do. |
| 41 | Allyl | H | H | do | 248 | Do. |
| 42 | do | H | H | 2'-hydroxy-5'-methylphenyl | 158 | Do. |
| 43 | 3-methoxybutyl | H | H | 2'-amino-4'-hydroxyphenyl | 133 | Do. |
| 44 | do | H | H | 2'-propionylamino-4'-hydroxyphenyl | 168 | Do. |
| 45 | do | H | H | 2'-(4''-methyl)-phenylsulfonylamino-4'-hydroxyphenyl | 92 | Do. |
| 46 | 2-(2'-methoxy)-ethoxyethyl | H | H | 2'-acetylamino-4'-hydroxyphenyl | 180 | Do. |
| 47 | Ethyl | 2-hydroxy | H | 2'-hydroxy-5'-methylphenyl | >300 | Do. |
| 48 | Phenyl | H | H | 2'-hydroxy-5'-isoamylphenyl | 137 | Do. |
| 49 | do | H | H | 2'-hydroxy-5'-phenylphenyl | 151 | Do. |
| 50 | 3-methoxybutyl | H | H | 4'-hydroxy-5'-aminophenyl | 144 | Do. |
| 51 | do | H | H | 2',4'-dihydroxyphenyl | 157 | Do. |
| 52 | Ethyl | H | H | 4'-hydroxy-5'-isonitrosomethylphenyl | 161 | Do. |
| 53 | Phenyl | H | H | 4'-hydroxy-phenyl | >300 | Do. |
| 54 | do | H | H | 2'-acetylamino-4'-hydroxyphenyl | >300 | Do. |
| 55 | 2-ethoxyethyl | H | H | do | 207 | Do. |
| 56 | Ethyl | 2-methylsulfonyl | H | 2'-hydroxy-5'-methylphenyl | 235 | Do. |
| 57 | Phenyl | H | H | 2'-hydroxy-5'-iso-octylphenyl | 124 | Do. |
| 58 | do | H | H | 2'-hydroxy-5'-cyclohexylphenyl | 112 | Do. |
| 59 | 2-phenoxy-ethyl | H | H | 2',4'-dihydroxyphenyl | 168 | Do. |
| 60 | do | H | H | 2'-acetylamino-4'-hydroxyphenyl | 212 | Do. |
| 61 | Phenyl | H | H | 2',4'-dihydroxyphenyl | >300 | Do. |
| 62 | do | H | H | 3'-acetylamino-4'-hydroxyphenyl | 111 | Do. |
| 63 | Ethyl | H | H | 2'-hydroxy-5'-tert.-butylphenyl | 135 | Do. |
| 64 | Phenyl | H | H | 2'-hydroxy-5'-acetylaminophenyl | 196 | Do. |
| 65 | Ethyl | H | H | 2'-acetylamino-4'-hydroxyphenyl | 240 | Do. |

¹ Decomp.

Representative Example is Example 55. The dyestuff according thereto corresponds to the formula:

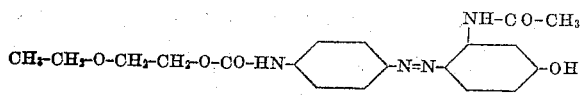

Example 66

A dyebath is prepared with 0.6 part of the dyestuff obtainable according to Example 1 and dispersed with the aid of Turkey red oil, 6 parts of a fatty alcohol sulfonate and 3000 parts of water. 100 parts of acetate silk are entered into the bath at room temperature; the bath is heated slowly to 80° in the course of 1 hour and maintained at this level for a further hour. After this time the dyeing process is completed. The goods are removed from the bath, rinsed and dried.

In order to improve the degree of dispersion the dyestuff may be ground prior to the dyeing process with suitable wetting, dispersing or emulsifying agents, preferably in presence of inorganic salts, for example Glauber's salt. Alternatively, an aqueous paste of the dyestuff may be intimately mixed with a dispersing agent and then converted into a dyestuff powder by suitable means of drying.

Example 67

300 parts of solvent (93% acetone, 7% methanol) are run into 100 parts of cellulose acetate, the mixture stirred for a short while and left overnight to swell.

0.5 part of the dyestuff obtainable according to Example 5 is dissolved in 85 parts of the solvent by simple shaking and then added to the cellulose acetate solution. The mixture is stirred in an open-topped vessel until 60 parts of the solvent have evaporated.

The dye mass is fed into the spinning machine and spun in the normal way. The filament is reeled off into hanks which are ready for further use.

Having thus disclosed the invention, what is claimed is:

1. A water-insoluble monoazo dyestuff which corresponds to the formula

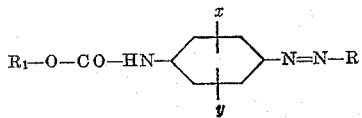

wherein R stands for the radical of a member selected from the group consisting of mono- and dinuclear aromatic hydroxy compounds coupled in one of the ortho- and para-positions to the hydroxy group, $R_1$ stands for a member selected from the group consisting of lower alkyl, lower alkenyl, lower hydroxyalkyl, lower methoxyalkyl, lower ethoxyalkyl, lower alkoxyethoxyethyl, lower dialkylaminoethyl, mononuclear aryloxyethyl, cyclohexyl, morpholinoethyl, phenyl, lower alkylphenyl, lower phenylalkyl and lower alkoxyphenyl radicals, $x$ stands for a member selected from the group consisting of hydrogen, chlorine, hydroxy, lower alkoxy, lower alkylsulfonyl and nitro, and $y$ stands for a member selected from the group consisting of hydrogen and methyl.

2. A water-insoluble monoazo dyestuff which corresponds to the formula

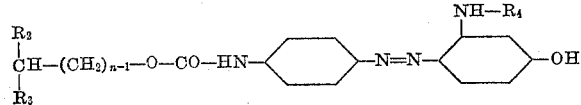

wherein $R_2$ stands for a member selected from the group consisting of hydrogen and branched and unbranched lower alkyl radicals, $R_3$ stands for a member selected from the group consisting of hydrogen, hydroxy, alkoxy, dialkylamino and lower alkyl, $R_4$ stands for an acyl radical containing from 1 to 18 carbon atoms, $n$ stands for one of the integers 1, 2, 3, 4, 5 and 6.

3. The water-insoluble monoazo dyestuff which corresponds to the formula

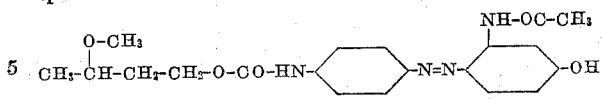

4. The water-insoluble monoazo dyestuff which corresponds to the formula

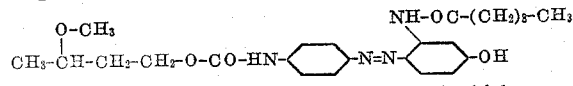

5. The water-insoluble monoazo dyestuff which corresponds to the formula

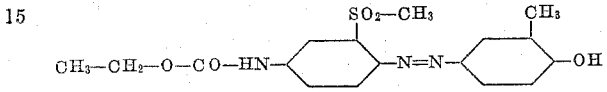

6. The water insoluble monoazo dyestuff which corresponds to the formula

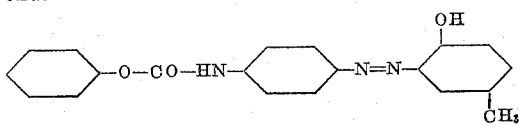

7. The water-insoluble monoazo dyestuff which corresponds to the formula

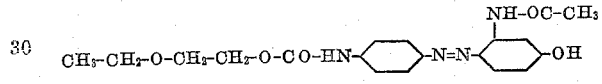

References Cited in the file of this patent
UNITED STATES PATENTS

| | | |
|---|---|---|
| 1,706,484 | Fischer et al. | Mar. 26, 1929 |
| 1,735,960 | Dreyfus | Nov. 19, 1929 |

UNITED STATES PATENT OFFICE
Certificate of Correction

Patent No. 2,831,850

April 22, 1958

Ernest Merian et al.

It is hereby certified that error appears in the printed specification of the above numbered patent requiring correction and that the said Letters Patent should read as corrected below.

Column 2, line 33, for "basis" read —basic—; column 3, line 4, for "condition" read —conditions—; line 21, for "acid-(3″-methoxy-butyl" read —acid-(3″-methoxy)-butyl—; line 53, for "-4′-methyl)-" read —-(4′-methyl)-—; line 74, for "prssure" read —pressure—; column 4, line 54, for "dystuff" read —dyestuff—; column 6, line 27, for "peroxides" read —peroxide—; column 17, line 17, Example 6, fourth formula, left-hand portion thereof, for "CH₂—CH—CH₂—O—CO—NH—" read
—CH₂=CH—CH₂—O—CO—NH—

Signed and sealed this 14th day of October 1958.

[SEAL]

Attest:
KARL H. AXLINE,
Attesting Officer.

ROBERT C. WATSON,
Commissioner of Patents.